US012664012B2

(12) United States Patent
Panda et al.

(10) Patent No.: US 12,664,012 B2
(45) Date of Patent: Jun. 23, 2026

(54) WORKLOAD LINKED PERFORMANCE SCALING FOR SERVERS

(71) Applicant: Intel Corporation, Santa Clara, CA (US)

(72) Inventors: Subhankar Panda, Portland, OR (US);
Rupal M. Parikh, Austin, TX (US);
Gaurav Porwal, Portland, OR (US);
Raghavendra Nagaraj, Bangalore (IN);
Sagar C. Pawar, Bangalore (IN);
Prakash Pillai, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/957,311

(22) Filed: Sep. 30, 2022

(65) Prior Publication Data

US 2024/0111560 A1 Apr. 4, 2024

(51) Int. Cl.

| | |
|---|---|
| *G06F 9/46* | (2006.01) |
| *G06F 9/355* | (2018.01) |
| *G06F 9/455* | (2018.01) |
| *G06F 9/50* | (2006.01) |

(52) U.S. Cl.
CPC ........ *G06F 9/45558* (2013.01); *G06F 9/3555* (2013.01); *G06F 9/505* (2013.01); *G06F 2009/4557* (2013.01); *G06F 2009/45595* (2013.01)

(58) Field of Classification Search
CPC .................................................. G06F 9/45558
USPC ........................................................ 718/102
See application file for complete search history.

(56) References Cited

U.S. PATENT DOCUMENTS

| | | | | |
|---|---|---|---|---|
| 7,739,548 B2* | 6/2010 | Goodrum | .............. | G06F 1/3203 |
| | | | | 713/320 |
| 7,861,102 B1* | 12/2010 | Ranganathan | ........ | G06F 1/3206 |
| | | | | 713/340 |
| 2007/0011480 A1* | 1/2007 | Banginwar | ............. | G06F 1/324 |
| | | | | 713/323 |

(Continued)

FOREIGN PATENT DOCUMENTS

| | | |
|---|---|---|
| WO | 2014123587 A1 | 8/2014 |
| WO | 2016130282 A1 | 8/2016 |
| WO | 2021258391 A1 | 12/2021 |

OTHER PUBLICATIONS

Extended European Search Report issued Feb. 15, 2024 for EP Application No. 23190940.9, 10 pages.

*Primary Examiner* — Mehran Kamran
(74) *Attorney, Agent, or Firm* — Schwabe, Williamson & Wyatt, P.C.

(57) ABSTRACT

Embodiments herein relate to providing uniform servicing of workloads at a set of servers in a computer network. A platform determines and meets the performance requirements of a workload by scaling a performance capability of a group of processing units such as central processing units (CPUs) which are assigned to service the workload. This can involve increasing the power (P) state of one or more of the processing units to a highest P state in the group, so that every processing units in the group provides the same performance for a given workload. The platform can manage scaling of the processing units performance by reading a performance profile list which indicates minimum and maximum scaling points for programs that are executed to service the workload.

18 Claims, 5 Drawing Sheets

(56)     References Cited

U.S. PATENT DOCUMENTS

| | | | |
|---|---|---|---|
| 2008/0235364 A1* | 9/2008 | Gorbatov ................ | G06F 1/324 709/224 |
| 2011/0055597 A1* | 3/2011 | Wyatt ................... | G06F 1/3203 345/212 |
| 2013/0151869 A1* | 6/2013 | Steinman .............. | G06F 1/3243 713/300 |
| 2014/0181539 A1* | 6/2014 | Lin ........................ | G06F 1/3275 713/300 |
| 2015/0055590 A1* | 2/2015 | Wu ........................ | H04J 3/1694 370/329 |
| 2016/0054775 A1* | 2/2016 | Rajappa ................... | G06F 1/30 713/320 |
| 2016/0239065 A1* | 8/2016 | Lee ........................ | G06F 1/3296 |
| 2016/0349828 A1* | 12/2016 | Weissmann ........... | G06F 1/3296 |
| 2017/0371401 A1* | 12/2017 | Rotem ................. | G06F 9/30145 |
| 2017/0371719 A1* | 12/2017 | Majumdar ............ | G06F 9/5094 |
| 2018/0039317 A1* | 2/2018 | Riguer ................. | G06F 1/3243 |
| 2018/0101214 A1* | 4/2018 | Mahindru ............. | G06F 9/5094 |
| 2019/0079806 A1* | 3/2019 | Ragland ................. | G06F 1/324 |
| 2020/0183485 A1* | 6/2020 | Das ......................... | G06F 1/324 |
| 2021/0026708 A1* | 1/2021 | Weissmann ............... | G06F 1/08 |
| 2022/0164196 A1* | 5/2022 | Beckett .............. | G06F 9/44505 |
| 2022/0318056 A1* | 10/2022 | Malaya ................... | G06F 9/505 |
| 2022/0335317 A1* | 10/2022 | Segner ................. | G06N 20/00 |
| 2023/0176873 A1* | 6/2023 | Wu ........................... | G06F 1/00 713/1 |
| 2024/0111560 A1* | 4/2024 | Panda ................... | G06F 9/3555 |
| 2024/0281043 A1* | 8/2024 | Rohrkemper ...... | H05K 7/20718 |
| 2025/0253958 A1* | 8/2025 | Soloff ................... | G06Q 10/08 |

* cited by examiner

WORKLOAD LINKED PERFORMANCE SCALING FOR SERVERS

FIELD

The present application generally relates to the field of computer networks and more particularly to the servicing of workloads at one or more servers.

BACKGROUND

In a computer network, cloud service providers seek consistent performance across a wide set of workloads which span multiple Central Processing Units (CPUs) or other processing units in one or more servers. In some cases, the servers include multiple CPUs in respective sockets to handle a greater number of operations per second. The service providers are expected to provide a consistent and predictable level of performance. However, various challenges are presented in servicing the workloads.

BRIEF DESCRIPTION OF THE DRAWINGS

The embodiments of the disclosure will be understood more fully from the detailed description given below and from the accompanying drawings of various embodiments of the disclosure, which, however, should not be taken to limit the disclosure to the specific embodiments, but are for explanation and understanding only.

DETAILED DESCRIPTION

Figure 1A:
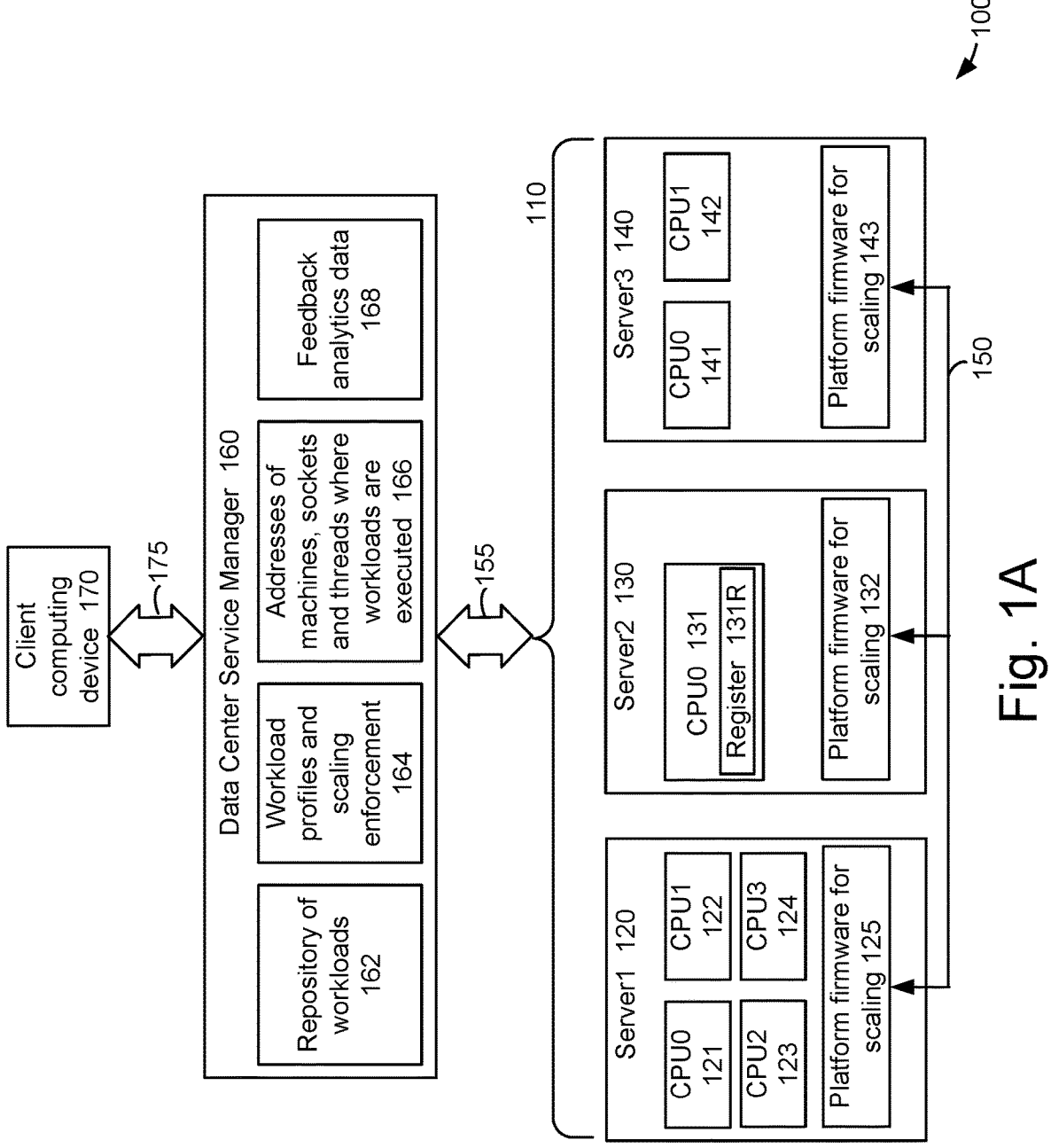
FIG. 1A depicts an example computing system 100 which includes a Data Center Service Manager 160 for assigning tasks to CPUs in a set of servers 110, in accordance with various embodiments.

As mentioned at the outset, various challenges are presented in servicing the workloads at a set of servers in a computer network. For example, a number of processing units such as CPUs can be arranged in one or more multi-socket servers, e.g., with 2, 4, 6 or more sockets, and/or in a collection of multiple co-operating servers. For instance, a High Performance Computing (HPC) workload for weather forecasting might run over multiple cooperating server blades with 1-4 CPUs each, and an expectation is for all threads in those servers to work identically with a preset performance expectation. A server blade is a stripped-down server computer with a modular design optimized to minimize the use of physical space and energy.

Other examples of processing units include a core of a CPU, a System on a Chip (SoC), an Accelerated Processing Unit (APU) and a Graphics Processing Unit (GPU). A processing unit could also include multiples of the above-mentioned components.

A CPU is electronic circuitry that executes instructions comprising a computer program. The CPU performs basic arithmetic, logic, controlling, and input/output (I/O) operations specified by the instructions in the program. Principal components of a CPU typically include an arithmetic logic unit (ALU) that performs arithmetic and logic operations, processor registers that supply operands to the ALU and store the results of ALU operations, and a control unit that orchestrates the fetching (from memory), decoding and execution (of instructions) by directing the coordinated operations of the ALU, registers and other components.

Most modern CPUs are implemented on integrated circuit (IC) microprocessors, with one or more CPUs on a single IC chip. A chip can contain multiple CPUs or cores, in a multi-core processor arrangement.

A multi-core processor is a microprocessor on a single integrated circuit with two or more separate processing units, called cores, each of which reads and executes program instructions. The instructions are ordinary CPU instructions (such as add, move data, and branch) but the single processor can run instructions on separate cores at the same time, increasing overall speed for programs that support multithreading or other parallel computing techniques. Manufacturers typically integrate the cores onto a single integrated circuit die known as a chip multiprocessor or onto multiple dies in a single chip package.

A SoC is an integrated circuit that integrates most or all components of a computer or other electronic system. These components typically include a CPU, memory interfaces, on-chip input/output devices, I/O interfaces, and secondary storage interfaces, all on a single substrate or microchip.

An APU is a microprocessor combining a general-purpose CPU and integrated GPU on a single die.

A GPU is a specialized electronic circuit designed to manipulate and alter memory to accelerate the creation of images in a frame buffer intended for output to a display device. GPUs are used in embedded systems, mobile phones, personal computers, workstations, and game consoles. Their parallel structure makes them more efficient than general-purpose CPUs for algorithms that process large blocks of data in parallel. In a personal computer, a GPU can be present on a video card or embedded on the motherboard. In some CPUs, they are embedded on the CPU die.

However, power management policies are typically either based on single thread performance states or limited to one CPU socket where the threads can scale. Current performance schemes do not consider the requirement for a specific workload.

One possible solution involves overclocking, which is dominant in the gaming industry and personal computer (PC) segments. Overclocking involves increasing the clock rate of a computer to exceed a rate which is certified by the manufacturer. Performance states referred to as P states and a Turbo state can also be used. P0 is the highest performance state, resulting in maximum performance, while P1, P2, and so on are lower performance states, which will save power but at some penalty to CPU performance. There can be any number of available power sates. Typically, a higher clock speed and voltage are associated with higher processor performance. Turbo allows running one or many CPU cores to higher P-states than usual. However, this does not provide a platform solution for both a single board server and a set of servers connected within a data center, where there are potentially more than 2, 4 or 6 sockets in a system.

Generally, a performance state can represent a P state, a clock frequency and/or a clock frequency, voltage pair. The P states mentioned above are power performance states according to the Advanced Configuration and Power Interface (ACPI) Specification. The ACPI specification was developed to establish industry common interfaces enabling robust operating system (OS)-directed motherboard device configuration and power management of both devices and entire systems. P-states provide a way to scale the frequency and voltage at which the processor runs so as to reduce the power consumption of the CPU. The number of available P-states can be different for each model of CPU, even those from the same family.

In one approach, each processing unit such as CPU or CPU core has its own power state.

Even for a given P state, the clock frequency and/or voltage can be adjusted to adjust the power level/state.

Other possible solutions provide multiple CPU performance configurations for users to choose at the time of manufacture, but this does not allow dynamic scaling of CPU performance.

Generally, these solutions do not directly accommodate the varied requirements of cloud scale workloads. Instead, servers follow a client approach where a thread in a CPU is seen as a sole computing entity as opposed to a set of cooperating threads (a cloud requirement).

The apparatuses and techniques discussed herein address the above and other issues. A cloud scale architecture is provided where workloads can be scaled to provide service level agreements via a guaranteed scaling point.

In one aspect, a platform determines and meets the performance requirements of a workload by scaling a performance capability of a group of CPUs which are assigned to service the workload. Servicing of the workload refers to executing programs/instructions to complete tasks of the workload. In one possible approach, the scaling involves increasing the P state of one or more of the CPUs to a highest P state in the group. Performance between the CPUs can thus be maintained by adjusting the P-states of individual CPUs so that every CPU in the group provides the same performance for a given workload. This results in a predictable execution time for the tasks. Moreover, the core frequency for the different states can be the same or different. The processor P-state denotes the capability of running the processor at different voltage and/or frequency levels.

The platform can further include a managing circuit which queries the CPUs to determine their current performance states, adjust the performance states if indicated, and coordinate the assignment of workload tasks to the CPUs.

In another aspect, the platform manages scaling of the CPU performance by reading a performance profile list as part of the P state adjustment for one or more CPUs.

All corrections can be handled within the clock frequency specification to avoid overclocking, in one approach.

In another aspect, the platform offers respective capability pointers for integration at the operating system level.

A number of advantages can be achieved. For example, coordinated scaling across sockets, blades and within perimeter of a service can be achieved. Additionally, the techniques can be extended to components such as Infrastructure Processing Units (IPUs) and their performance in a data center environment. The IPU is a programmable networking device designed to enable cloud and communication service providers to reduce overhead and free up performance for CPUs.

The techniques are also valuable when cloud service providers deploy an operating system-free environment.

Further, in a virtualized environment, each Virtual CPU (VCPU) can be controlled to provide homogeneous performance over different generations of processor models which may operate at different frequencies or instructions per clock cycle.

Finally, cloud service providers can charge a premium to provide the techniques discussed herein.

These and other features will be further apparent in view of the following discussion.

FIG. 1A depicts an example computing system 100 which includes a Data Center Service Manager 160 (DCSM) for assigning tasks to CPUs in a set of servers, in accordance with various embodiments. The DCSM, which can be considered to be part of a managing circuit, includes a repository of workloads (block 162), workload profiles for scaling enforcement (block 164), addresses of machines, sockets and threads where workloads are executed (block 166), and feedback analytics data (block 168). The DCSM can receive requests with workloads from a client computing device 170 via a path 175, for example. The DCSM communicates with a set of servers 110 including an example Server1 120, Server2 130 and Server3 140 via a path 155.

Each server includes one or more CPUs, also sometimes referred to as sockets. For example, Server1 includes four CPUs: CPU0 121, CPU1 122, CPU2 123 and CPU3 124. Server1 also includes platform firmware for scaling 125. Server2 includes one CPU: CPU0 131 having a register 131R, discussed further below. Server2 also includes platform firmware for scaling 132. Server3 includes two CPUs: CPU0 141 and CPU1 142. Server3 also includes platform firmware for scaling 143. The platform firmware for scaling in each server can communicate with one another via a path 150. The platform firmware can be considered to be part of a managing circuit.

The computing system can provide a data center environment in which the DCSM manages the deployment of workloads needed for a specific service. Example services could include a weather forecasting service which processes workloads to provide a weather forecast, or a maps service which retrieves map data for a user's mobile device. Deployment of the set of workloads could be done on one or more servers which each comprise a single socket or multi-socket platform.

Regarding block 162, the repository of workloads may be operated by a cloud service provider and includes the workloads which are transmitted by the client device.

Regarding block 164, the workload profiles and scaling enforcement comprises requirements for each workload and a performance profile list. The scaling enforcement can involve adjusting the power states of the CPUs to provide a uniform performance level when servicing a workload. The DCSM can query the respective servers to obtain their capabilities and determine if the workload scaling option is available across the board. The cloud service provider can have a service level agreement (SLA) with the client which specifies what performance will be delivered, and for what price.

An example performance profile list can be provided as follows.
   a) Name of the workload
   b) Performance profile array [ ]—contains a set of programs that are executed on a core/CPU within a specific server in the premises of the service.
   c) Minimum Scaling array [ ]—defines a minimum scaling point for the specific program in the performance profile array. This could be a minimum scaling, Smin, of the CPU.

d) Maximum Scaling array [ ]—defines a maximum scaling point for the specific program in the performance profile array. This could be a maximum scaling, Smax, of the CPU.

For example, consider a map service such as Google® map service:

Name of workload="Google Maps."

Performance Profile array [ ]={"Task-1", "Task-2" . . . "Task-N" }—the map service is divided into N tasks which eventually get deployed. The tasks could be, e.g., retrieving road data, terrain data, traffic data and so forth.

Minimum Scaling array [ ]={"Smin," "Sfix1", . . . "Sfixm" }.

Maximum Scaling array [ ]={"Smax," "Sfix1", . . . "Sfixm" }.

Task-1 will operate between Scaling Points {Smin, Smax}. The different scaling points could correspond to different power states, for example. For instance, Smax could correspond to the P0 power state and Smin could correspond to a low power state.

Task-2 will operate at a fixed Scaling Point, Sfix1, because both minimum and maximum scaling points are fixed at that value.

Task-N will operate at a different scaling point from Task-2, i.e., Sfixm vs. Sfix1.

Regarding the scaling enforcement, the DCSM determines the number of CPUs needed to service a workload in the repository of workloads. The DCSM can query each server/CPU for their capability for scaling. Based on a response to the query, the DCSM can build the performance profile list. The DCSM can further communicate with each server separately or instruct one or more servers with a subset of the performance profile list so that the respective server can use the path 150 to proliferate the instructions to one or more other peer servers.

Regarding block 166, the DCSM remembers the set of servers/blades and threads where the service was launched and the thread or virtual machine (VM) migration aspects to keep the database current.

Regarding block 168, this can involve gathering data on sockets or threads of the servers which are not able to perform due to aging or other conditions such as thermal effects. Each server may provide health related information, e.g., any error information that could potentially degrade the service point, for analytics purposes.

Regarding the path 150, this facilitates interaction between different cooperating servers about the present deployment, e.g., to allow the DCSM to instruct one server to control one or more other peer servers via their out of band management networks.

The platform firmware for scaling provides a capability and enforcement of the scaling factor such as based on the process described above in connection with block 164. This is beneficial in particular when servers do not run an operating system. Instead, the DCSM can act as a load balancer and dispatch tasks to CPUs. This can be achieved, e.g., through a Baseboard Management Controller (BMC) or Platform Controller Hub (PCH). A BMC is a small, specialized processor used for remote monitoring and management of a host system. PCH is a family of microchips of Intel Corporation. See also FIG. 3 for further details.

One additional possible feature involves a capability to advertise the availability of the scaling feature described herein in a specific CPU. This performance scaling capability can be exposed to clients, e.g., users or customers, in various ways. One approach uses a register such as a register within each CPU. For example, CPU0 131 includes a register 131R. The other CPUs can each have a register as well, but these are not shown for simplicity. One example type of register is a Model Specific Register (MSR), which is any of various control registers in the x86 instruction set used for debugging, program execution tracing, computer performance monitoring, and toggling certain CPU features. Another example type of register is a Chipset Control and Status Register, which reports the status and changes the behavior of the processor. Another option uses a firmware assisted Device Specific Method (DSM). This is a method which provides for individual, device-specific data and control functions that can be called by a device driver without conflicting with other such device-specific methods. The platform firmware for scaling can assist in providing this capability.

An example of binary values stored in the register and the associated description follows. The data represents an advertisement by each CPU or server of its capability to be scaled. For example, 00 represents a default value in which neither the base clock nor core ratios can be altered. The base clock is a clock rate of a CPU at idle or during low power tasks. The core ratio, or multiplier, determines the speed of a CPU such that the overall speed of the CPU is calculated by multiplying the base clock speed by this ratio. This setting in the register acts as a de-feature scheme for a specific customer's usage. No P state change is allowed for the CPU.

01 indicates the base clock cannot be altered, but support for alteration of the core ratio is available. Only a change in the P state minimum is allowed. 10 indicates the base clock can be altered but the core ratio cannot be altered. Only a change in the P state maximum is allowed. 11 indicates both the base clock and core ratios can be altered. Changes in both the P state minimum and the P state maximum are allowed.

In some cases, the DCSM or other managing circuit can access the registers to determine a capability of the CPUs to be scaled.

Figure 1B:
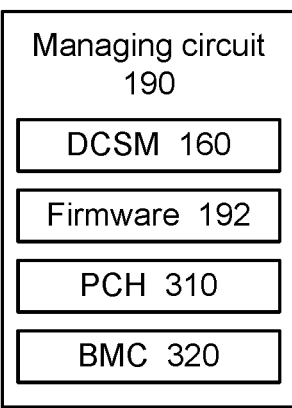
FIG. 1B depicts a block diagram of example components of a managing circuit for managing workloads in the computing system of FIG. 1A, in accordance with various embodiments.

FIG. 1B depicts a block diagram of example components of a managing circuit for managing workloads in the computing system of FIG. 1A, in accordance with various embodiments. The managing circuit 190 includes the DCSM 160, firmware 192, e.g., platform firmware for scaling 125, 132 and 143, and a Platform Controller Hub (PCH) 310 and a Baseboard Management Controller (BMC) 320, discussed further below is connection with FIG. 3.

Figure 2:
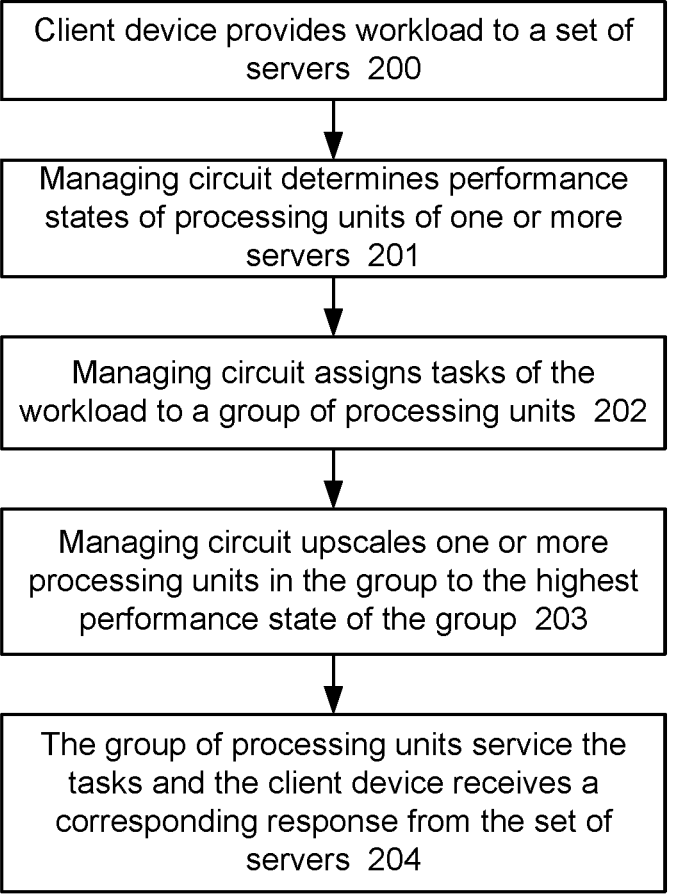
FIG. 2 depicts a flowchart of an example process for use with the computing system 100 of FIG. 1, in accordance with various embodiments.

FIG. 2 depicts a flowchart of an example process for use with the computing system 100 of FIG. 1, in accordance with various embodiments. In step 200, a client device provides a workload to a set of servers. At step 201, a managing circuit, such as the DCSM 160, determines performance states of processing units of one or more servers, e.g., Server1-Server3 of the set of servers. At step 202, the managing circuit assigns tasks of the workload to a group of processing units. This can be a selected group which is a subset of all available servers, in one approach. At step 203, the managing circuit upscales, e.g., increases the performance state of, one or more processing units in the group to the highest performance state of the group. For example, assume the processing units are CPUs and that CPU0 121, CPU0 131 and CPU0 141 are in the group and their performance states are P0, P1 and P2, respectively. Since P0 is the highest performance state in the group, CPU0 131 and CPU0 141 are instructed to transition from the P1 and P2 states, respectively, to P0. As another example, assume CPU0 121, CPU0 131 and CPU0 141 are in the group and their performance states are P1, P1 and P2, respectively. Since P1 is the highest performance state in the group, CPU0 141 is instructed to transition from the P2 state to P1.

At step 204, the group of processing units service the tasks and the client device receives a corresponding response from the set of servers.

In one approach, the DCSM assigns the tasks to the processing units before adjusting the power states. In this case, a processing unit may begin servicing a task at a lower power state and subsequently transition to a higher power state when instructed to do so by a managing circuit. In another approach, the DCSM assigns the tasks to the processing units after sending instructions to adjust the power states. The DCSM may also obtain a confirmation that the processing units have transitioned into the desired power states before assigning the tasks.

In one option, to assign the tasks of a workload to a group of CPUs, for instance, the managing circuit is to determine a required number of CPUs to service the workload, query each CPU of the plurality of CPUs to determining their respective performance state, and assign the tasks to CPUs having a common performance state if a number of the CPUs having the common performance state is at least equal to the required number of CPUs needed to service the workload. For example, the managing circuit can select a group of CPUs all in the P1 state. In this case the managing circuit locates CPUs which are all in the same state to service the workload. This avoids the need to adjust the performance states of the CPUs and provides a consistent performance for each task.

In another option, to assign the tasks of a workload to a group of CPUs, the managing circuit is to determine a required number of CPUs to service the workload, query each CPU of the plurality of CPUs to determining their respective performance state, and assign the tasks to the CPUs having the different performance states if a number of the CPUs having a common performance state is less than the required number of CPUs needed to service the workload. In this case, the managing circuit has to assign the workload to CPUs with different performance states. The performance states can then be adjusted.

In another option, instead of adjusting the power states to match the highest power state of the group of CPUs, it is possible to adjust the power states to match another power state in the group, such as a mid-range power state. For example, with CPUs in P0, P1 and P2, the P0 and P2 states can be transitioned to P1. Another option is to adjust the power states to a state which is not currently used in the group of CPUs. For example, with CPUs in P0, P1 and P3, each CPU can be transitioned to P2. These approaches also provide a consistent performance for each task.

Figure 3:
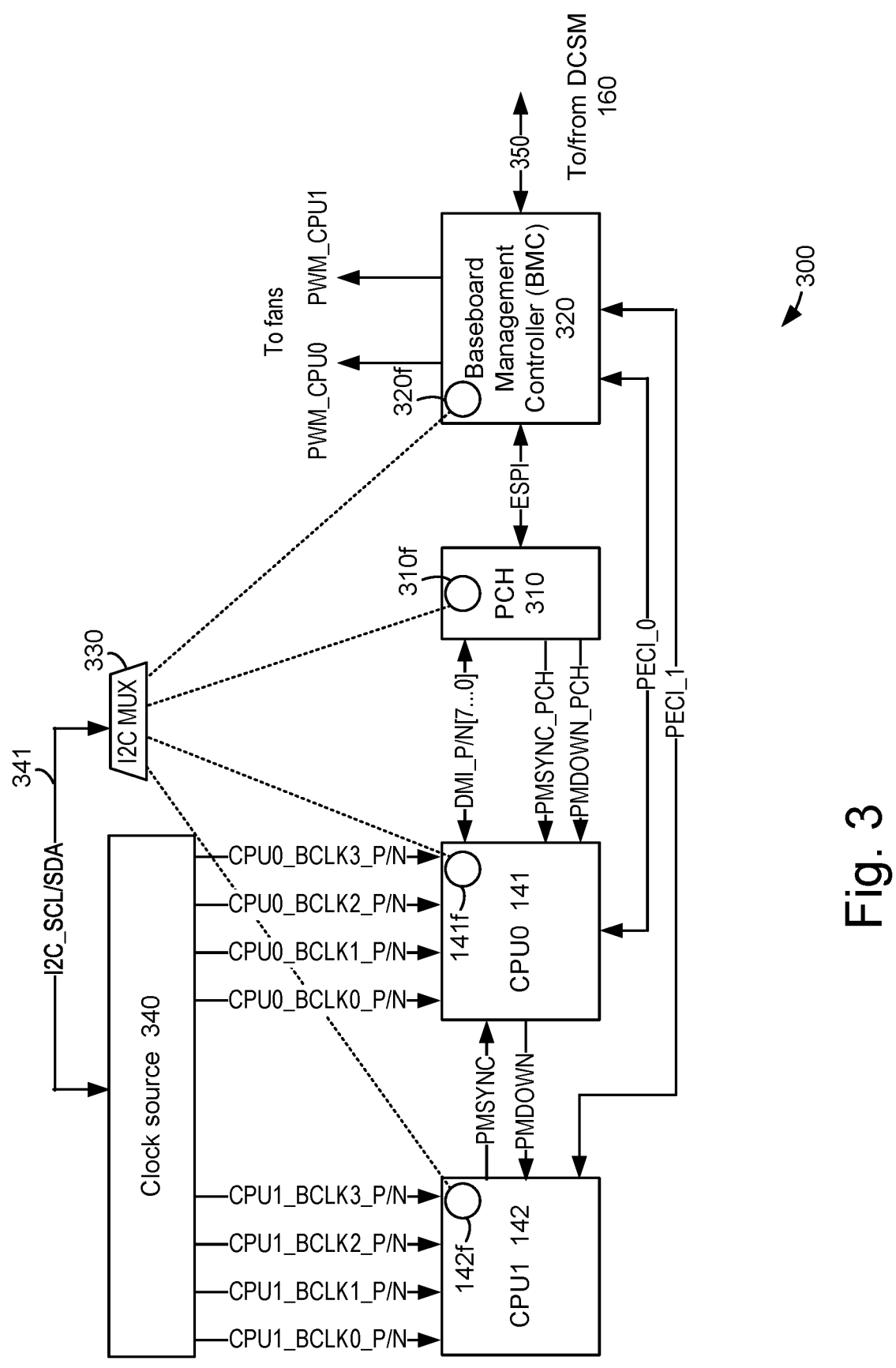
FIG. 3 depicts an example circuit 300 for setting a performance state of the CPU0 141 and CPU2 142 of Server3 of FIG. 1, in accordance with various embodiments.

FIG. 3 depicts an example circuit 300 for setting a performance state of the CPU0 141 and CPU2 142 of Server3 of FIG. 1, in accordance with various embodiments. In one approach, the circuit 300 is part of a server.

The diagram depicts the CPUs of Server3 as an example, which is a two-CPU server, but the concept could be applied to any number of CPUs per server. The circuit includes platform firmware for scaling utilizing a base clock scheme. A clock source 340 can provide four clock signals, for example, to each CPU. The CPU can select one of the clock signals and/or apply a core ratio to the base clock rate to operate in a desired performance state. The four clock signals provided to CPU1 142 are CPU1_BCLK0_P/N, CPU1_BCLK1_P/N, CPU1_BCLK2_P/N and CPU1_BCLK3_P/N. The four clock signals provided to CPU0 141 are CPU0_BCLK0_P/N, CPU0_BCLK1_P/N, CPU0_BCLK2_P/N and CPU0_BCLK3_P/N. Generally, each power state can be associated with a different voltage, clock frequency pair.

The clock source is responsive to a signal, I2C_SCL/SDA, on an inter-integrated circuit (I2C) bus 341 from an I2C multiplexer 330. The multiplexer in turn is responsive to outputs from firmware 142f, 141f, 310f and/or 320f associated with the CPU1 142, the CPU0 141, the PCH 310 and the Baseboard Management Controller (BMC) 320, respectively. The PCH and BMC can be considered to be part of a managing circuit.

Generally, the platform firmware for scaling can be part of the CPU, PCH, Manageability Engine or any embedded micro-controllers within the server blade. The Intel Management Engine is an autonomous subsystem that has been incorporated in processor chipsets, in the PCH of a motherboard. The platform firmware can also be part of the third-party chip called a Baseboard Management Controller (BMC) 320, mentioned previously. To manage operations via a base clock change, it would master the I2C MUX and drive I2C signals with specific values for CPU_BCLK. In addition, platform firmware for scaling could alter Core Ratios by interacting with the CPU hardware, e.g., via Model Specific Registers, mentioned previously.

CPU0 and CPU1 can communicate with the BMC 320 via signals PECI_0 and PECI_1. PECI, or Platform Environment Control Interface, is a single wire serial interface that provides a communication channel between processors and chipset components to external system management logic and thermal monitoring devices. Also, PECI provides an interface for external devices to read processor temperature, perform processor manageability functions, and manage processor interface tuning and diagnostics. Typically in server platforms, the CPUs are controlled by the PCH using PECI.

CPU1 can provide a signal PMSYNC to CPU0, and CPU0 can provide a signal PMDOWN to CPU1. PMSYNC, or Power Management Sync, is a sideband signal to communicate power management status from the PCH to a processor. PMDOWN, or power management down, allows a CPU to be placed in lower performance state. Corresponding signals PMSYNC_PCH and PMDOWN_PCH are provided from the PCH to CPU0. DMI_P/N[7 . . . 0] is an interface for communication between the PCH and CPU0. DMI, or Direct Media Interface, is an eight-lane chip-to-chip interconnect that connects a processor and the PCH.

The PCH and the BMC can communicate via an ESPI. ESPI, or Enhanced Serial Peripheral Interface, can be used by the PCH to support connection of an embedded controller (typically used in a mobile platform) or a serial input-output (typically used in a desktop platform) to the platform.

Based on their performance states, the BMC can output signals PWM_CPU0 and PWM_CPU1 to control fans speeds of the CPU0 141 and CPU 142, respectively. PWM denotes pulse width modulation, where a larger duty cycle corresponds to a larger on time for a fan. The BMC can also communicate with the DCSM 160 via a path 350.

Figure 4:
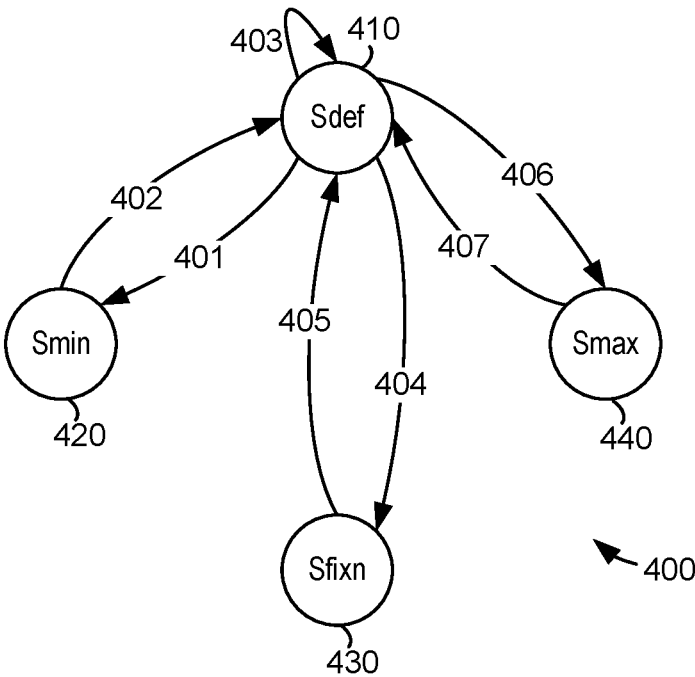
FIG. 4 depicts an example state diagram 400 for any of the CPUs of FIG. 1, in accordance with various embodiments.

FIG. 4 depicts an example state diagram 400 for any of the CPUs of FIG. 1, in accordance with various embodiments. A CPU can be in a definite power state 410, Sdef, a minimum power state 420, Smin, a maximum power state 440, Smax, or a fixed state 430, Sfixn. Sdef is a state in which there is no adaptive scaling of the power state. This state can be maintained as represented by the arrow 403, where the CPU/socket level adaptive scaling is not initiated.

Arrow 401 indicates a transition from Sdef to Smin. The platform firmware, based on the performance profile array, can detect a task n scaling across multiple sockets. If a higher scaling level is not needed, then for those CPUs/sockets/cores, a minimum performance range will be applied based on the performance profile list.

Arrow 402 indicates a transition from Smin to Sdef. The need for a workload operating point can be detected and fed back to the platform scaling firmware. Feedback and analytics data can be collected to confirm whether the identified CPUs/sockets/cores are in the Smin state, i.e., whether or nor the desired state is achieved.

Arrow 404 indicates a transition from Sdef to Sfixn. The platform scaling firmware detects that some of the workloads/application can be operated at a fixed performance, i.e., each CPU/socket/core could be in a fixed performance state starting from Sfix1 . . . Sfixn based on the performance profile list.

Arrow 405 indicates a transition from Sfixn to Sdef. The need for a workload fixed operating point can be detected and fed back to the platform scaling firmware. Feedback and analytics data can be collected to confirm whether the identified CPUs/sockets/cores are in specific state of Sfix1 . . . Sfixn or not.

Arrow 406 indicates a transition from Sdef to Smax. The platform scaling firmware can drive changes for scaling up to Smax for a specific system or CPUs/sockets/cores based on the performance profile list.

Arrow 407 indicates a transition from Smax to Sdef. A goal can be to remain in Sdef or to transition to Smin or Sfixn via Sdef. The platform scaling firmware may detect the need for a workload fixed operating point, or the need to transition to a minimum or fixed performance state.

Figure 5:
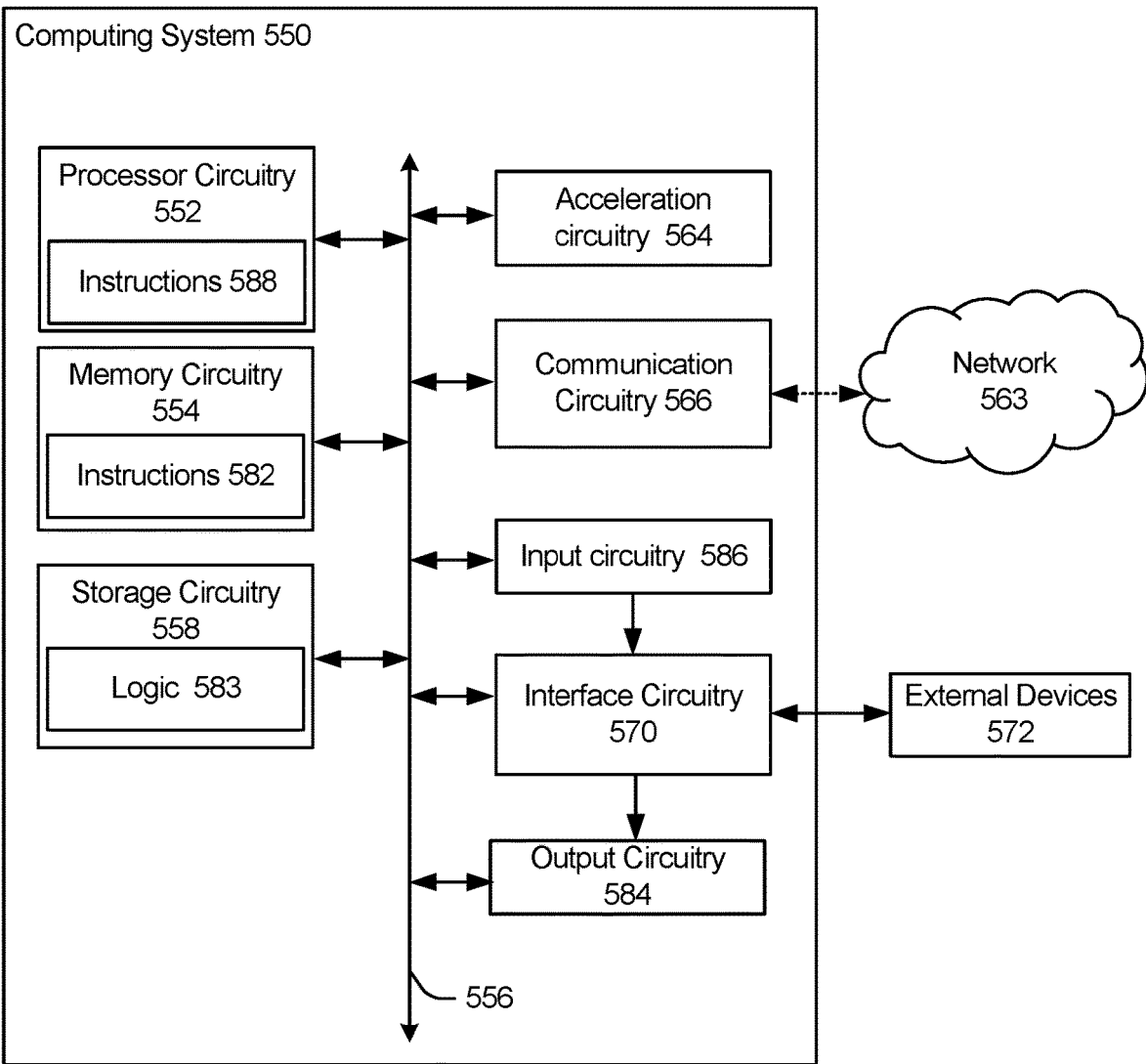
FIG. 5 illustrates an example of components that may be present in a computing system 550 for implementing the techniques (e.g., operations, processes, methods, and methodologies) described herein.

FIG. 5 illustrates an example of components that may be present in a computing system 550 for implementing the techniques (e.g., operations, processes, methods, and methodologies) described herein. The computing system can represent any of the managing circuits discussed herein, or any of the servers 120, 130 or 140 of FIG. 1A, for example. The memory circuitry 554 may store instructions and the processor circuitry 552 may execute the instructions to perform the functions described herein including the process of FIG. 2.

The computing system 550 may include any combinations of the hardware or logical components referenced herein. The components may be implemented as ICs, portions thereof, discrete electronic devices, or other modules, instruction sets, programmable logic or algorithms, hardware, hardware accelerators, software, firmware, or a combination thereof adapted in the computing system 550, or as components otherwise incorporated within a chassis of a larger system. For one embodiment, at least one processor 552 may be packaged together with computational logic 582 and configured to practice aspects of various example embodiments described herein to form a System in Package (SiP) or a System on Chip (SoC).

The system 550 includes processor circuitry in the form of one or more processors 552. The processor circuitry 552 includes circuitry such as, but not limited to one or more processor cores and one or more of cache memory, low drop-out voltage regulators (LDOs), interrupt controllers, serial interfaces such as SPI, I2C or universal programmable serial interface circuit, real time clock (RTC), timer-counters including interval and watchdog timers, general purpose I/O, memory card controllers such as secure digital/multi-media card (SD/MMC) or similar, interfaces, mobile industry processor interface (MIPI) interfaces and Joint Test Access Group (JTAG) test access ports. In some implementations, the processor circuitry 552 may include one or more hardware accelerators (e.g., same or similar to acceleration circuitry 564), which may be microprocessors, programmable processing devices (e.g., FPGA, ASIC, etc.), or the like. The one or more accelerators may include, for example, computer vision and/or deep learning accelerators. In some implementations, the processor circuitry 552 may include on-chip memory circuitry, which may include any suitable volatile and/or non-volatile memory, such as DRAM, SRAM, EPROM, EEPROM, Flash memory, solid-state memory, and/or any other type of memory device technology, such as those discussed herein The processor circuitry 552 may include, for example, one or more processor cores (CPUs), application processors, GPUs, RISC processors, Acorn RISC Machine (ARM) processors, CISC processors, one or more DSPs, one or more FPGAs, one or more PLDs, one or more ASICs, one or more baseband processors, one or more radio-frequency integrated circuits (RFIC), one or more microprocessors or controllers, a multi-core processor, a multithreaded processor, an ultra-low voltage processor, an embedded processor, or any other known processing elements, or any suitable combination thereof. The processors (or cores) 552 may be coupled with or may include memory/storage and may be configured to execute instructions stored in the memory/storage to enable various applications or operating systems to run on the platform 550. The processors (or cores) 552 is configured to operate application software to provide a specific service to a user of the platform 550. In some embodiments, the processor(s) 552 may be a special-purpose processor(s)/controller(s) configured (or configurable) to operate according to the various embodiments herein.

As examples, the processor(s) 552 may include an Intel® Architecture Core™ based processor such as an i3, an i5, an i7, an i9 based processor; an Intel® microcontroller-based processor such as a Quark™, an Atom™, or other MCU-based processor; Pentium® processor(s), Xeon® processor(s), or another such processor available from Intel® Corporation, Santa Clara, California. However, any number other processors may be used, such as one or more of Advanced Micro Devices (AMD) Zen® Architecture such as Ryzen® or EPYC® processor(s), Accelerated Processing Units (APUs), MxGPUs, Epyc® processor(s), or the like; A5-A12 and/or S1-S4 processor(s) from Apple® Inc., Snapdragon™ or Centrig™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; the ThunderX2® provided by Cavium™, Inc.; or the like. In some implementations, the processor(s) 552 may be a part of a system on a chip (SoC), System-in-Package (SiP), a multi-chip package (MCP), and/or the like, in which the processor(s) 552 and other components are formed into a single integrated circuit, or a single package, such as the Edison™ or Galileo™ SoC boards from Intel® Corporation. Other examples of the processor(s) 552 are mentioned elsewhere in the present disclosure.

The system 550 may include or be coupled to acceleration circuitry 564, which may be embodied by one or more AI/IL accelerators, a neural compute stick, neuromorphic hardware, an FPGA, an arrangement of GPUs, one or more SoCs (including programmable SoCs), one or more CPUs, one or more digital signal processors, dedicated ASICs (including programmable ASICs), PLDs such as complex (CPLDs) or high complexity PLDs (HCPLDs), and/or other forms of specialized processors or circuitry designed to accomplish one or more specialized tasks. These tasks may include AI/IL processing (e.g., including training, inferencing, and classification operations), visual data processing, network data processing, object detection, rule analysis, or the like. In FPGA-based implementations, the acceleration circuitry 564 may comprise logic blocks or logic fabric and other interconnected resources that may be programmed (configured) to perform various functions, such as the procedures, methods, functions, etc. of the various embodiments discussed herein. In such implementations, the acceleration circuitry 564 may also include memory cells (e.g., EPROM, EEPROM, flash memory, static memory (e.g., SRAM, antifuses, etc.) used to store logic blocks, logic fabric, data, etc. in LUTs and the like.

In some implementations, the processor circuitry 552 and/or acceleration circuitry 564 may include hardware elements specifically tailored for machine learning and/or artificial intelligence (AI) functionality. In these implementations, the processor circuitry 552 and/or acceleration circuitry 564 may be, or may include, an AI engine chip that can run many different kinds of AI instruction sets once loaded with the appropriate weightings and training code. Additionally or alternatively, the processor circuitry 552 and/or acceleration circuitry 564 may be, or may include, AI accelerator(s), which may be one or more of the aforementioned hardware accelerators designed for hardware acceleration of AI applications. As examples, these processor(s) or accelerators may be a cluster of artificial intelligence (AI) GPUs, tensor processing units (TPUs) developed by Google® Inc., Real AI Processors (RAPs™) provided by AlphaICs@, Nervana™ Neural Network Processors (NNPs) provided by Intel® Corp., Intel® Movidius™ Myriad™ X Vision Processing Unit (VPU), NVIDIA® PX™ based GPUs, the NM500 chip provided by General Vision®, Hardware 3 provided by Tesla®, Inc., an Epiphany™ based processor provided by Adapteva®, or the like. In some embodiments, the processor circuitry 552 and/or acceleration circuitry 564 and/or hardware accelerator circuitry may be implemented as AI accelerating co-processor(s), such as the Hexagon 685 DSP provided by Qualcomm®, the PowerVR 2NX Neural Net Accelerator (NNA) provided by Imagination Technologies Limited®, the Neural Engine core within the Apple® A11 or A12 Bionic SoC, the Neural Processing Unit (NPU) within the HiSilicon Kirin 970 provided by Huawei®, and/or the like. In some hardware-based implementations, individual subsystems of system 550 may be operated by the respective AI accelerating co-processor(s), AI GPUs, TPUs, or hardware accelerators (e.g., FPGAs, ASICs, DSPs, SoCs, etc.), etc., that are configured with appropriate logic blocks, bit stream(s), etc. to perform their respective functions.

The system 550 also includes system memory 554. Any number of memory devices may be used to provide for a given amount of system memory. As examples, the memory 554 may be, or include, volatile memory such as random access memory (RAM), static RAM (SRAM), dynamic RAM (DRAM), synchronous DRAM (SDRAM), RAM-BUS® Dynamic Random Access Memory (RDRAM®), and/or any other desired type of volatile memory device. Additionally or alternatively, the memory 554 may be, or include, non-volatile memory such as read-only memory (ROM), erasable programmable ROM (EPROM), electrically erasable programmable (EEPROM), flash memory, non-volatile RAM, ferroelectric RAM, phase-change memory (PCM), flash memory, and/or any other desired type of non-volatile memory device. Access to the memory

554 is controlled by a memory controller. The individual memory devices may be of any number of different package types such as single die package (SDP), dual die package (DDP) or quad die package (Q17P). Any number of other memory implementations may be used, such as dual inline memory modules (DIMMs) of different varieties including but not limited to microDIMMs or MiniDIMMs.

Storage circuitry 558 provides persistent storage of information such as data, applications, operating systems and so forth. In an example, the storage 558 may be implemented via a solid-state disk drive (SSDD) and/or high-speed electrically erasable memory (commonly referred to as "flash memory"). Other devices that may be used for the storage 558 include flash memory cards, such as SD cards, microSD cards, XD picture cards, and the like, and USB flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, phase change RAM (PRAM), resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a Domain Wall (DW) and Spin Orbit Transfer (SOT) based device, a thyristor based memory device, a hard disk drive (HDD), micro HDD, of a combination thereof, and/or any other memory. The memory circuitry 554 and/or storage circuitry 558 may also incorporate three-dimensional (3D) cross-point (XPOINT) memories from Intel® and Micron®.

The memory circuitry 554 and/or storage circuitry 558 is/are configured to store computational logic 583 in the form of software, firmware, microcode, or hardware-level instructions to implement the techniques described herein. The computational logic 583 may be employed to store working copies and/or permanent copies of programming instructions, or data to create the programming instructions, for the operation of various components of system 550 (e.g., drivers, libraries, application programming interfaces (APIs), etc.), an operating system of system 550, one or more applications, and/or for carrying out the embodiments discussed herein. The computational logic 583 may be stored or loaded into memory circuitry 554 as instructions 582, or data to create the instructions 582, which are then accessed for execution by the processor circuitry 552 to carry out the functions described herein. The processor circuitry 552 and/or the acceleration circuitry 564 accesses the memory circuitry 554 and/or the storage circuitry 558 over the interconnect (IX) 556. The instructions 582 direct the processor circuitry 552 to perform a specific sequence or flow of actions, for example, as described with respect to flowchart(s) and block diagram(s) of operations and functionality depicted previously. The various elements may be implemented by assembler instructions supported by processor circuitry 552 or high-level languages that may be compiled into instructions 588, or data to create the instructions 588, to be executed by the processor circuitry 552. The permanent copy of the programming instructions may be placed into persistent storage devices of storage circuitry 558 in the factory or in the field through, for example, a distribution medium (not shown), through a communication interface (e.g., from a distribution server (not shown)), over-the-air (OTA), or any combination thereof.

The IX 556 couples the processor 552 to communication circuitry 566 for communications with other devices, such as a remote server (not shown) and the like. The communication circuitry 566 is a hardware element, or collection of hardware elements, used to communicate over one or more networks 563 and/or with other devices. In one example, communication circuitry 566 is, or includes, transceiver circuitry configured to enable wireless communications using any number of frequencies and protocols such as, for example, the Institute of Electrical and Electronics Engineers (IEEE) 802.11 (and/or variants thereof), IEEE 802.23.4, Bluetooth® and/or Bluetooth® low energy (BLE), ZigBee®, LoRaWAN™ (Long Range Wide Area Network), a cellular protocol such as 3GPP LTE and/or Fifth Generation (5G)/New Radio (NR), and/or the like. Additionally or alternatively, communication circuitry 566 is, or includes, one or more network interface controllers (NICs) to enable wired communication using, for example, an Ethernet connection, Controller Area Network (CAN), Local Interconnect Network (LIN), DeviceNet, ControlNet, Data Highway+, or PROFINET, among many others.

The IX 556 also couples the processor 552 to interface circuitry 570 that is used to connect system 550 with one or more external devices 572. The external devices 572 may include, for example, sensors, actuators, positioning circuitry (e.g., global navigation satellite system (GNSS)/Global Positioning System (GPS) circuitry), client devices, servers, network appliances (e.g., switches, hubs, routers, etc.), integrated photonics devices (e.g., optical neural network (ONN) integrated circuit (IC) and/or the like), and/or other like devices.

In some optional examples, various input/output (I/O) devices may be present within or connected to, the system 550, which are referred to as input circuitry 586 and output circuitry 584. The input circuitry 586 and output circuitry 584 include one or more user interfaces designed to enable user interaction with the platform 550 and/or peripheral component interfaces designed to enable peripheral component interaction with the platform 550. Input circuitry 586 may include any physical or virtual means for accepting an input including, inter alia, one or more physical or virtual buttons (e.g., a reset button), a physical keyboard, keypad, mouse, touchpad, touchscreen, microphones, scanner, headset, and/or the like. The output circuitry 584 may be included to show information or otherwise convey information, such as sensor readings, actuator position(s), or other like information. Data and/or graphics may be displayed on one or more user interface components of the output circuitry 584. Output circuitry 584 may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Crystal Displays (LCD), LED displays, quantum dot displays, projectors, etc.), with the output of characters, graphics, multimedia objects, and the like being generated or produced from the operation of the platform 550. The output circuitry 584 may also include speakers and/or other audio emitting devices, printer(s), and/or the like. Additionally or alternatively, sensor(s) may be used as the input circuitry 584 (e.g., an image capture device, motion capture device, or the like) and one or more actuators may be used as the output device circuitry 584 (e.g., an actuator to provide haptic feedback or the like). Peripheral component interfaces may include, but are not limited to, a non-volatile memory port, a USB port, an audio jack, a power supply interface, etc. In some embodiments, a display or console hardware, in the context of the present system, may be used to provide output and receive input of an edge computing system; to manage components or services of an edge computing system; identify a state of an edge computing component or service; or to conduct any other number of management or administration functions or service use cases.

The components of the system 550 may communicate over the IX 556. The IX 556 may include any number of technologies, including ISA, extended ISA, I2C, SPI, point-to-point interfaces, power management bus (PMBus), PCI, PCIe, PCIx, Intel® UPI, Intel® Accelerator Link, Intel® CXL, CAPI, OpenCAPI, Intel® QPI, UPI, Intel® OPA IX, RapidIO™ system IXs, CCIX, Gen-Z Consortium IXs, a HyperTransport interconnect, NVLink provided by NVIDIA®, a Time-Trigger Protocol (TTP) system, a FlexRay system, PROFIBUS, and/or any number of other IX technologies. The IX 556 may be a proprietary bus, for example, used in a SoC based system.

The number, capability, and/or capacity of the elements of system 550 may vary, depending on whether computing system 550 is used as a stationary computing device (e.g., a server computer in a data center, a workstation, a desktop computer, etc.) or a mobile computing device (e.g., a smartphone, tablet computing device, laptop computer, game console, IoT device, etc.). In various implementations, the computing device system 550 may comprise one or more components of a data center, a desktop computer, a workstation, a laptop, a smartphone, a tablet, a digital camera, a smart appliance, a smart home hub, a network appliance, and/or any other device/system that processes data.

The techniques described herein can be performed partially or wholly by software or other instructions provided in a machine-readable storage medium (e.g., memory). The software is stored as processor-executable instructions (e.g., instructions to implement any other processes discussed herein). Instructions associated with the flowchart (and/or various embodiments) and executed to implement embodiments of the disclosed subject matter may be implemented as part of an operating system or a specific application, component, program, object, module, routine, or other sequence of instructions or organization of sequences of instructions.

The storage medium can be a tangible machine readable medium such as read only memory (ROM), random access memory (RAM), flash memory devices, floppy and other removable disks, magnetic storage media, optical storage media (e.g., Compact Disk Read-Only Memory (CD ROMS), Digital Versatile Disks (DVDs)), among others.

The storage medium may be included, e.g., in a communication device, a computing device, a network device, a personal digital assistant, a manufacturing tool, a mobile communication device, a cellular phone, a notebook computer, a tablet, a game console, a set top box, an embedded system, a TV (television), or a personal desktop computer.

Some non-limiting examples of various embodiments are presented below.

Example 1 includes an apparatus, comprising: a plurality of processing units arranged in one or more servers; and a managing circuit in communication with the plurality of processing units, wherein each processing unit operates in a respective performance state and informs the managing circuit of the respective performance state, the managing circuit assigns tasks of a workload to a group of processing units among the plurality of processing units, determines whether the processing units in the group are in different performance states and, if the processing units in the group are in different performance states, increase a performance state of one of more of the processing units of the group to match a highest performance state of the group of processing units, to service the tasks in each processing unit of the group at the highest performance state of the group.

Example 2 include the apparatus of Example 1, wherein the respective performance state of each processing unit is selected from a plurality of available performance states, each performance state having a different voltage, frequency pair.

Example 3 include the apparatus of Example 1 or 2, wherein the respective performance state of each processing unit is selected from a plurality of available performance states, each performance state having a different clock frequency.

Example 4 include the apparatus of any one of Examples 1-3, wherein the managing circuit comprises a register, the register stores a value for each processing unit, and for each processing unit, the value indicates that neither a base clock nor a core ratio can be altered, the core ratio but not the base clock can be altered, the base clock but not the core ratio can be altered or both the base clock and the core ratio can be altered.

Example 5 include the apparatus of Example 4, wherein the register indicates a performance scaling capability of each processing unit.

Example 6 include the apparatus of any one of Examples 1-5, wherein the managing circuit assigns the tasks to the group of processing units based on a performance profile of the workload, the performance profile comprises a name of the workload, a performance profile array, a minimum scaling array and a maximum scaling array.

Example 7 include the apparatus of Example 6, wherein: the performance profile array indicates a set of programs to be executed on the group of processing units; the minimum scaling array indicates a minimum scaling point for each program; and the maximum scaling array indicates a maximum scaling point for each program.

Example 8 include the apparatus of Example 7, wherein for at least one of the programs, the minimum scaling point is equal to the maximum scaling point such that the program will operate at a fixed scaling point.

Example 9 include the apparatus of any one of Examples 1-8, wherein to assign the tasks of the workload to the group of processing units, the managing circuit is to determine a required number of processing units to service the workload, query each processing unit of the plurality of processing units to determining their respective performance state, and assign the tasks to processing units having a common performance state if a number of the processing units having the common performance state is at least equal to the required number of processing units needed to service the workload.

Example 10 include the apparatus of any one of Examples 1-9, wherein to assign the tasks of the workload to the group of processing units, the managing circuit is to determine a required number of processing units to service the workload, query each processing unit of the plurality of processing units to determining their respective performance state, and assign the tasks to the processing units having the different performance states if a number of the processing units having a common performance state is less than the required number of processing units needed to service the workload.

Example 11 include the apparatus of any one of Examples 1-10, wherein to inform the managing circuit of the respective performance state, each processing unit is to inform the managing circuit of a current scaling point.

Example 12 includes an apparatus, comprising: a memory to store instructions; and a processor to execute the instructions to: communicate a workload to a managing circuit for one or more servers, wherein the workload comprises a performance profile, and the performance profile comprises a name of the workload, a performance profile array, a minimum scaling array and a maximum scaling array, and the managing circuit is to assign the workload to a group of processing units of the one or more servers according to the performance profile; and receive a response from the one or more servers pursuant to the assignment.

Example 13 include the apparatus of Example 12, wherein: the performance profile array indicates a set of programs to be executed; the minimum scaling array indicates a minimum scaling point for each program; and the maximum scaling array indicates a maximum scaling point for each program.

Example 14 include the apparatus of Example 13, wherein for at least one of the programs, the minimum scaling point is equal to the maximum scaling point such that the program is to operate at a fixed scaling point.

Example 15 include the apparatus of any one of Examples 12-14, wherein in preparation for communicating the workload to the managing circuit, the processor is to execute the instructions to access a register associated with the managing circuit, the register stores a value for each processing unit of the one or more servers, and for each processing unit, the value indicates that neither a base clock nor a core ratio can be altered, the core ratio but not the base clock can be altered, the base clock but not the core ratio can be altered or both the base clock and the core ratio can be altered.

Example 16 include the apparatus of Example 15, wherein the memory and the processor are at a client device of the one or more servers, and the register indicates a performance scaling capability of each processing unit of the one or more servers.

Example 17 includes an apparatus, comprising: a memory to store instructions; and a processor to execute the instructions to: receive a workload; in response to the receiving of the workload, query each central processing unit of a plurality of processing units to determining respective performance states, wherein the processing units are arranged in one or more servers; based on the respective performance states, assign tasks of the workload to a group of processing units among the plurality of processing units; and if the processing units in the group are in different performance states, adjust a performance state of one of more of the processing units of the group to provide a common performance state across the group of processing units, to service the workload in each processing unit of the group at the common performance state.

Example 18 include the apparatus of Example 17, wherein to adjust the performance state of one of more of the processing units of the group, the processor is to execute the instructions to increase a performance state of one of more of the processing units of the group to match a highest performance state of the group of processing units, to service the workload in each processing unit of the group at the highest performance state of the group.

Example 19 include the apparatus of Example 17 or 18, wherein to adjust the performance state of one of more of the processing units of the group, the processor is to execute the instructions to instruct the one of more of the processing units to increase their performance state to the highest performance state of the group of processing units.

Example 20 include the apparatus of any one of Examples 17-19, wherein the processor is to execute the instructions to assign the tasks to the group of processing units based on a performance profile of the workload.

In the present detailed description, reference is made to the accompanying drawings that form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

The terms "substantially," "close," "approximately," "near," and "about," generally refer to being within +/−10% of a target value. Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

For the purposes of the present disclosure, the phrases "A and/or B" and "A or B" mean (A), (B), or (A and B). For the purposes of the present disclosure, the phrase "A, B, and/or C" means (A), (B), (C), (A and B), (A and C), (B and C), or (A, B, and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "circuitry" may refer to, be part of, or include an Application Specific Integrated Circuit (ASIC), an electronic circuit, a processor (shared, dedicated, or group), a combinational logic circuit, and/or other suitable hardware components that provide the described functionality. As used herein, "computer-implemented method" may refer to any method executed by one or more processors, a computer system having one or more processors, a mobile device such as a smartphone (which may include one or more processors), a tablet, a laptop computer, a set-top box, a gaming console, and so forth.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or link, and/or the like.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional elements.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. The embodiments of the disclosure are intended to embrace all such alternatives, modifications, and variations as to fall within the broad scope of the appended claims.

In addition, well-known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

What is claimed is:

1. An apparatus, comprising:
   a plurality of processing units arranged in one or more servers; and
   a managing circuit in communication with the plurality of processing units, wherein each processing unit operates in a respective performance state and informs the managing circuit of the respective performance state, the managing circuit assigns tasks of a workload to a group of processing units among the plurality of processing units, determines whether the processing units in the group are in different performance states and, if the processing units in the group are in different performance states, increase a performance state of one of more of the processing units of the group to match a highest performance state of the group of processing units, to service the tasks in each processing unit of the group at the highest performance state of the group; wherein the managing circuit comprises a register, the register stores a value for each processing unit, and for each processing unit, the value indicates that neither a base clock nor a core ratio can be altered, the core ratio but not the base clock can be altered, the base clock but not the core ratio can be altered or both the base clock and the core ratio can be altered.

2. The apparatus of claim 1, wherein the respective performance state of each processing unit is selected from a plurality of available performance states, each performance state having a different voltage, frequency pair.

3. The apparatus of claim 1, wherein the respective performance state of each processing unit is selected from a plurality of available performance states, each performance state having a different clock frequency.

4. The apparatus of claim 1, wherein the register indicates a performance scaling capability of each processing unit.

5. The apparatus of claim 1, wherein the managing circuit assigns the tasks to the group of processing units based on a performance profile of the workload, the performance profile comprises a name of the workload, a performance profile array, a minimum scaling array and a maximum scaling array.

6. The apparatus of claim 5, wherein:
the performance profile array indicates a set of programs to be executed on the group of processing units;
the minimum scaling array indicates a minimum scaling point for each program; and
the maximum scaling array indicates a maximum scaling point for each program.

7. The apparatus of claim 6, wherein for at least one of the programs, the minimum scaling point is equal to the maximum scaling point such that the program will operate at a fixed scaling point.

8. The apparatus of claim 1, wherein to assign the tasks of the workload to the group of processing units, the managing circuit is to determine a required number of processing units to service the workload, query each processing unit of the plurality of processing units to determining their respective performance state, and assign the tasks to processing units having a common performance state if a number of the processing units having the common performance state is at least equal to the required number of processing units needed to service the workload.

9. The apparatus of claim 1, wherein to assign the tasks of the workload to the group of processing units, the managing circuit is to determine a required number of processing units to service the workload, query each processing unit of the plurality of processing units to determining their respective performance state, and assign the tasks to the processing units having the different performance states if a number of the processing units having a common performance state is less than the required number of processing units needed to service the workload.

10. The apparatus of claim 1, wherein to inform the managing circuit of the respective performance state, each processing unit is to inform the managing circuit of a current scaling point.

11. An apparatus, comprising:
a memory to store instructions; and
a processor to execute the instructions to:
    communicate a workload to a managing circuit for one or more servers, wherein the workload comprises a performance profile, and the performance profile comprises a name of the workload, a performance profile array, a minimum scaling array and a maximum scaling array, and the managing circuit is to assign the workload to a group of processing units of the one or more servers according to the performance profile; and
    receive a response from the one or more servers pursuant to the assignment;
    wherein in preparation for communicating the workload to the managing circuit, the processor is to execute the instructions to access a register associated with the managing circuit, the register stores a value for each processing unit of the one or more servers, and for each processing unit, the value indicates that neither a base clock nor a core ratio can be altered, the core ratio but not the base clock can be altered, the base clock but not the core ratio can be altered or both the base clock and the core ratio can be altered.

12. The apparatus of claim 11, wherein:
the performance profile array indicates a set of programs to be executed;
the minimum scaling array indicates a minimum scaling point for each program; and
the maximum scaling array indicates a maximum scaling point for each program.

13. The apparatus of claim 12, wherein for at least one of the programs, the minimum scaling point is equal to the maximum scaling point such that the program is to operate at a fixed scaling point.

14. The apparatus of claim 11, wherein the memory and the processor are at a client device of the one or more servers, and the register indicates a performance scaling capability of each processing unit of the one or more servers.

15. An apparatus, comprising:
a memory to store instructions; and
a processor to execute the instructions to:
receive a workload;
in response to the receiving of the workload, query each processing unit of a plurality of processing units to determining respective performance states, wherein the processing units are arranged in one or more servers;
based on the respective performance states, assign tasks of the workload to a group of processing units among the plurality of processing units; and
if the processing units in the group are in different performance states, adjust a performance state of one of more of the processing units of the group to provide a common performance state across the group of processing units, to service the workload in each processing unit of the group at the common performance state, wherein the adjusting of the performance state of the one of more of the processing units comprises accessing a register to determine a performance scaling capability of the one of more of the processing units, wherein the register indicates whether at least one of a base clock or a core ratio of the one of more of the processing units can be altered.

16. The apparatus of claim 15, wherein to adjust the performance state of one of more of the processing units of the group, the processor is to execute the instructions to increase a performance state of one of more of the processing units of the group to match a highest performance state of the group of processing units, to service the workload in each processing unit of the group at the highest performance state of the group.

17. The apparatus of claim 15, wherein to adjust the performance state of one of more of the processing units of the group, the processor is to execute the instructions to instruct the one of more of the processing units to increase their performance state to a highest performance state of the group of processing units.

18. The apparatus of claim 15, wherein the processor is to execute the instructions to assign the tasks to the group of processing units based on a performance profile of the workload.

\* \* \* \* \*